TONE ARM LATCHING DEVICE

Filed Feb. 26, 1965 2 Sheets-Sheet 1

INVENTOR.
DAVID E. LAUX
BY
Eugene M. Whitacre
Attorney

INVENTOR.
DAVID E. LAUX
BY Eugene M. Whitacre
Attorney

United States Patent Office 3,356,373
Patented Dec. 5, 1967

3,356,373
TONE ARM LATCHING DEVICE

David E. Laux, Indianapolis, Ind., assignor to Radio Corporation of America, a corporation of Delaware
Filed Feb. 26, 1965, Ser. No. 435,554
6 Claims. (Cl. 274—23)

ABSTRACT OF THE DISCLOSURE

A tone arm latching device includes a cooperating armature and magnet in the tone arm and rest support respectively. The forward portion of the rest support is shaped to provide a fulcrum point. When the rear portion of the tone arm is raised, the tone arm pivots about the fulcrum point to provide a mechanical advantage to effect a smooth break between the magnet and armature.

This invention relates to phonograph record changer apparatus, and more particularly to a tone arm latching device which will securely hold the tone arm at its rest support when the phonograph is inoperative and which automatically provides a smooth release of the arm from the rest support when a record change cycle is initiated.

In phonographs of the type having automatic record changing means, it is desirable to provide a means for keeping the tone arm securely fastened to a rest piece so as to prevent damage to the stylus, tone arm balance adjustments, and associated mechanisms when the phonograph is inoperative. This is particularly necessary where the phonograph is likely to be moved or carried from place to place, such as is the case with portable type phonographs.

In the past, friction clips and hinged L and U shaped fasteners have been used as a means for latching the tone arm to a rest piece. These types of devices have the disadvantage of requiring an operator to remember to lock the tone arm to its rest piece when moving the phonograph and then remembering to unlock the tone arm before operating said phonograph.

A magnetic latching device for the tone arm, including an armature and a magnet in the tone arm and rest support respectively, or vice versa, provides automatic latching and unlatching of the tone arm of an automatic record player. One problem associated with tone arm latches of this type is that the tone arm is released in a sudden and jerky manner when the magnetic circuit between the magnet and armature is broken due to the raising of the tone arm by the mechanism associated with automatic record players.

It is therefore an object of the present invention to provide an improved magnetic latching device for use with automatic record players.

It is another object of the invention to provide an improved tone arm magnetic latching device for automatic record players which securely holds the tone arm to a rest piece when the record player is inoperative and which allows a smooth unlatching when a record playing cycle is initiated.

An automatic player embodying the invention includes a tone arm pivotally mounted on a baseboard for movement in both vertical and horizontal directions. When a record playing cycle is initiated the cycling mechanism vertically raises the pivoted rear portion of the tone arm prior to the normal pivoting of the tone arm away from the tone arm rest under the influence of a tone arm lift pin or elevating rod. Initially, the tone arm, which has a magnetic armature mounted thereon, is held fast to a rest piece containing a magnet suitably positioned to cooperate with said magnetic armature. The forward portion of the rest piece (i.e. away from the tone arm pivot) is shaped to provide a corner or "fulcrum" point. When the rear portion of the tone arm is raised, the tone arm pivots about the fulcrum point, thereby providing a smooth progressive break away from the magnet.

The invention will be further understood from the following description of an embodiment thereof when considered in connection with the accompanying drawing, and its scope is pointed out in the appended claims.

In the drawing, FIGURE 1 is a top view, in perspective, of a phonograph record changer including a tone arm and rest piece latching system, embodying the invention;

Figures 1, 2:
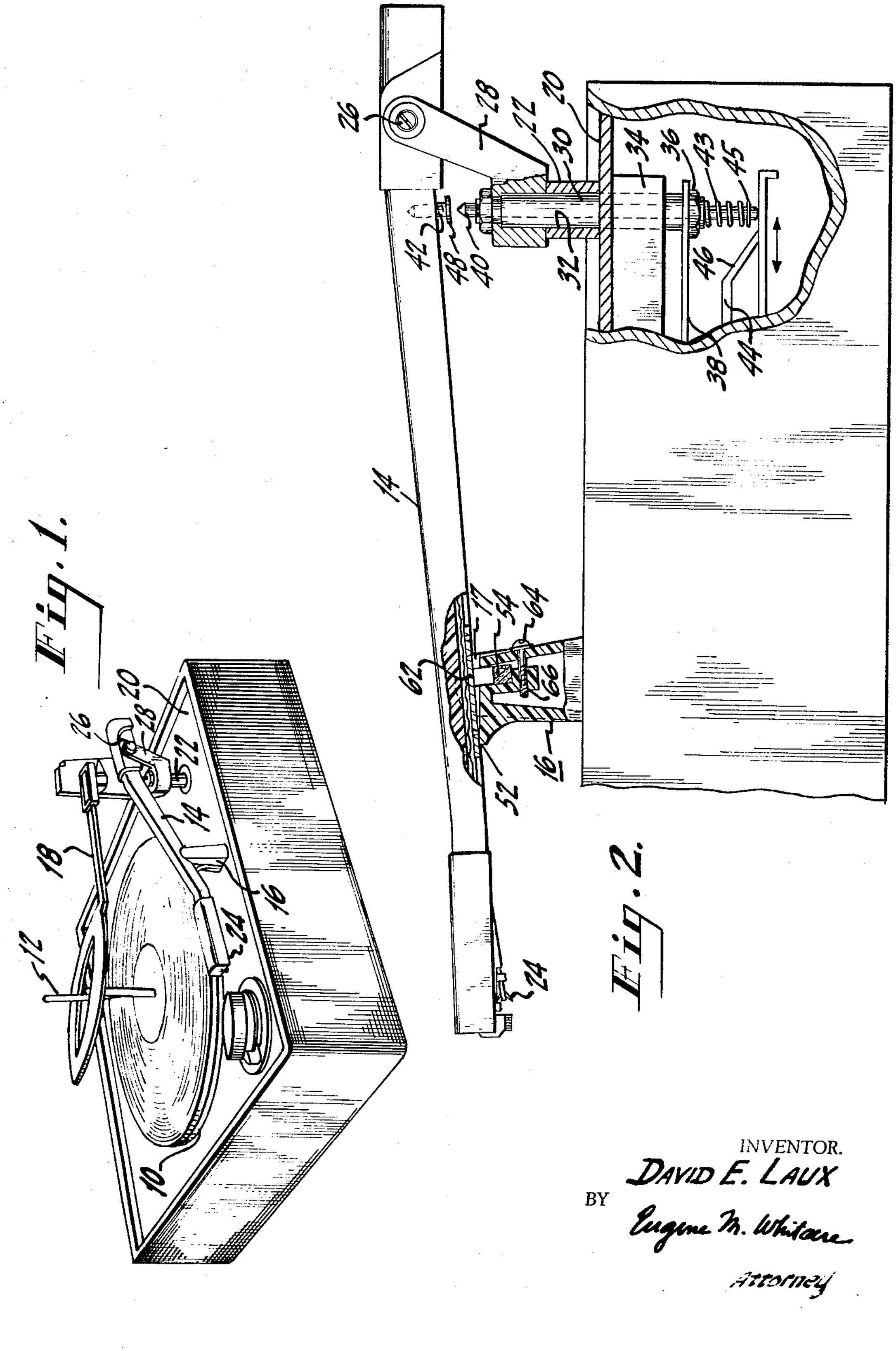
FIGURE 2 is a side view, partially in section, of the tone arm and rest piece latching system of FIGURE 1, showing the interior details thereof with the tone arm in rest position.

With more particular reference to the drawing, wherein like reference numerals are used in the different figures to designate like elements and parts, FIGURE 1 illustrates an automatic phonograph record changer including a turntable 10, a vertically extended spindle 12, a tone arm 14, a rest piece assembly 16, and the stabilizer arm 18 which is a component of a record changing mechanism (not shown).

In the illustrated structure, a motor board 20 serves to support the various parts and is provided with suitable bearings (not shown) to receive and support the turntable 10 for rotation about the vertically extended spindle 12. The motor board 20 is also provided with a suitable pillar 22 to mount the tone arm 14. The forward or free end of the tone arm 14 carries a suitable sound reproducing or phonograph pickup device 24 which is provided with a suitable stylus for engaging the sound groove of a record.

The changing mechanism of this apparatus is capable of providing a slight vertical lift to the tone arm axially along the centerline of the shaft 30. This vertical lift is imparted to the tone arm prior to the pivoting of the tone arm 14 upwardly away from the rest piece assembly 16. Such mechanisms are known in the art and will be discussed briefly.

Referring to FIGURE 2, the mechanism for moving the tone arm 14 includes a pivot pin 26 and swivel bracket 28 for connecting the tone arm 14 near one end thereof to a vertical shaft 30 extending through and rotatable within a bore 32 which is formed in the pillar 22. The lower portion of the shaft 30 further extends through the motorboard 20 and a support member 34 mounted beneath the motorboard 20.

The bottom end of the shaft 30 is threaded and is mechanically coupled by means of retaining nut 36 to a trip lever assembly plate 38. Thus rotation of the tone arm 22 and shaft 30 during a record playing cycle causes corresponding rotation of the trip lever assembly plate 38 so that the record changing mechanism may be tripped at the completion of a record playing cycle. A small amount of vertical play or movement (about 3/32") is provided for the shaft 30 as can be seen by comparing the vertical elevation of the trip lever assembly plate 38 in FIGURES 2 and 3.

An elevating rod or lift pin 40 is axially positioned within the shaft 30 and extends outwardly from the end portions thereof. The lower portion of the elevating rod 40 extends below the trip lever assembly plate 38 and the upper portion of the rod 40 extends toward the underside of the tone arm housing to engage a height adjustment screw 42 positioned therein.

On the initiation of a cycling operation of the automatic record changing mechanism, a record change cycle control slide member 44 containing an inclined cam surface 46 is caused to move horizontally beneath the elevating rod 40, thereby forcing the lower part of the rod 40 to engage and ride up the inclined cam surface 46.

The initial vertical movement of the rod 40 causes the shaft 30 and the rear end of the tone arm to be elevated vertically. This action results from a spring 43 which is positioned between the nut 36 and a C washer 45 on the rod 40. The shaft 30 continues to rise until the trip lever assembly plate 38 comes into contact with the support member 34. Thereafter the elevating rod continues to move vertically compressing the spring 43 until the upper end of the elevating rod 40 makes contact with a surface 48 of screw 42 to raise the tone arm 14 in a vertical plane about the pivot 26.

Figures 3, 4:
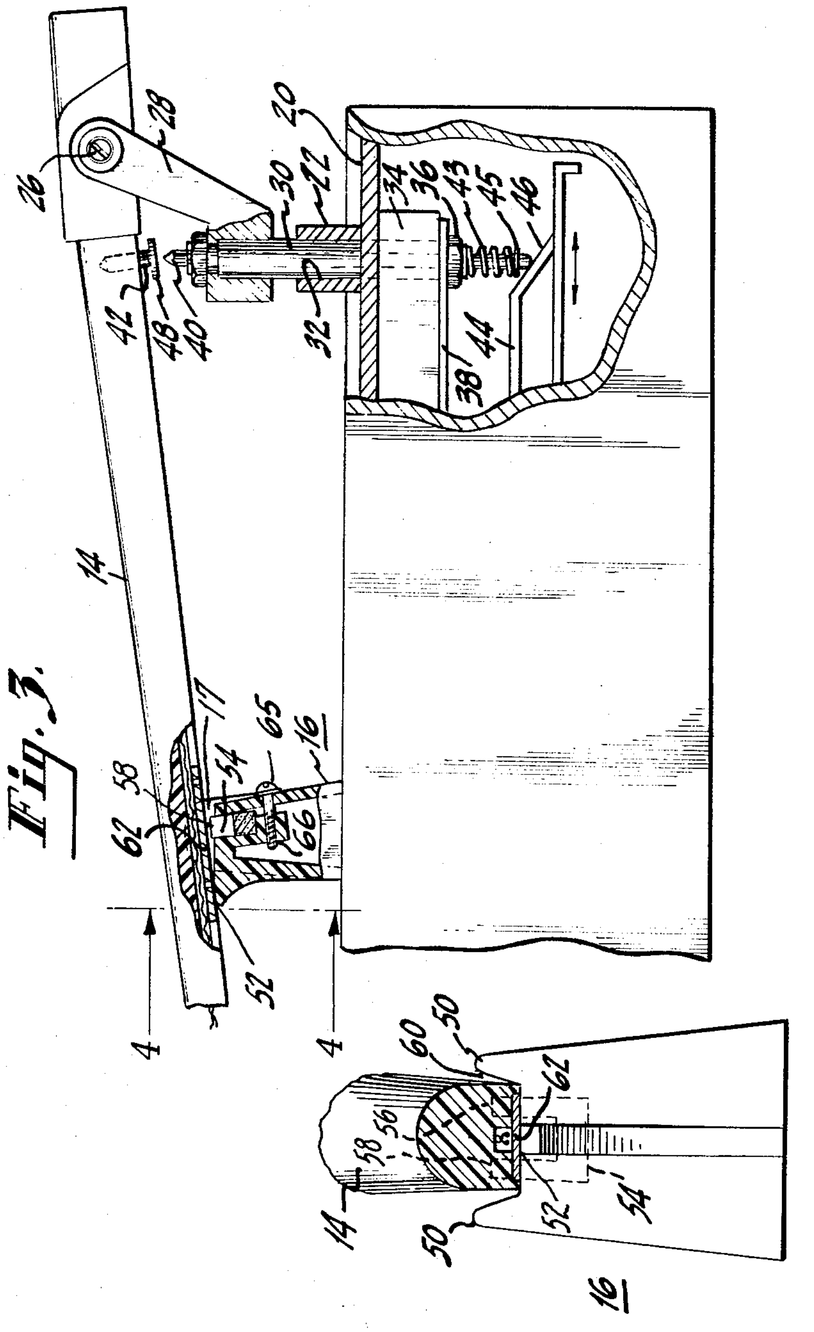
FIGURE 3 is a side view, and partially in section of the tone arm and rest piece latching system of FIGURE 1, showing the pivotal motion of the tone arm about the rest piece fulcrum point.
FIGURE 4 is a front view of the tone arm and rest piece latching system of FIGURE 3, showing further details of construction.

The rest piece assembly 16 is mounted on the motorboard 20 in a suitable position to contact and support the tone arm 14 when the phonograph is inoperative. The rest piece assembly 16 includes a pedestal 17 which may be molded of plastic or other nonmagnetic material and has upwardly extending side portions 50 (FIGURE 4) which serve as guides for seating the tone arm 14. As shown in FIGURES 2 and 3, the forward portion of the pedestal 17 is shaped to provide a corner or fulcrum point 52. The rest piece assembly 16 further includes a U-shaped magnet 54 positioned in the pedestal 17 so that its polar surfaces 56 and 58 extend upwardly in a recess 60 formed by and between the pedestal side portions 50.

An armature 62 of a magnetically attractable material, such as steel, is mounted on the underside of a portion of the tone arm 14 in a position to be engaged by the magnet 54 when the tone arm 14 is seated on the pedestal 17. When the tone arm 14 is seated on the pedestal 17 in engagement with the fulcrum 52, the magnet 54 may be further positioned for maximum contact of its polar surfaces 56 and 58 with the plate 62. The magnet 54 is then locked in place by means of a screw 64 positioned in a threaded opening 66 in the rear portion of the pedestal 17.

The operation of the mechanism will now be described. Prior to the initiation of a record changing cycle, the tone arm 14 is seated and magnetically held on the pedestal 17. Upon the initiation of said changing cycle, and under the influence of the changer cycling mechanism, the slide member 44 moves horizontally under the lower end of the elevating rod 40. The rod 40 then begins to ride up the cam 46 associated with the slide member 44. The tone arm 14 and shaft 30 rise vertically for a limited distance with the lift pin 40. Since the forward part of the tone arm is magnetically held to the pedestal 17, the vertical rise of the rear end of the tone arm causes said arm to pivot about the rest piece fulcrum point 52. Since the magnet 54 is stationary, this pivoting causes the surface area contact between the armature 62 and magnet 54 to gradually decrease, thereby breaking the magnetic contact in a smooth unbroken motion. When the magnetic contact between said armature 62 and magnet 54 is broken, the tone arm pivots in a vertical plane about the pivot 26 under the influence of the elevating rod 40 contact with the screw surface 48, and then continues its normal cycling operation.

Upon completion of the playing of the last record, the changer cycling mechanism automatically seats the tone arm on the pedestal 17 whereupon the armature 62 contacts the magnet 54 and the tone arm is firmly latched or held on the rest piece pedestal 17. It will be understood that an alternative rest piece assembly could use a fulcrum which is independent of the pedestal portion of the rest piece 16 such as, for example, a second plastic pedestal mounted on the motorboard to engage the tone arm at some location between the pickup end thereof and the armature 62.

In the present example, it was found desirable to space the fulcrum part of the rest piece assembly 4.6 inches from the axis of the shaft 30 and position the center line of the magnet 0.8 inch from the fulcrum point. It will be understood that these distance measurements are only by way of example and dependent on the attractive force of the magnet, the length of the tone arm, and the amount of vertical play provided for the shaft 30.

What is claimed is:

1. In an automatic record player mechanism of the type including a turntable, a tone arm, means for mounting said tone arm near one end thereof for movement in vertical and horizontal planes, and a tone arm controlling mechanism for moving said tone arm in horizontal and vertical planes:
   - a magnet;
   - an armature;
   - a tone arm rest piece assembly positioned adjacent said turntable for supporting said tone arm when said record player is not operating and including one of said magnet and armature mounted therein;
   - means for mounting the other of said magnet and armature in said tone arm at a position to engage said one of said magnet and armature when said tone arm is supported by said rest piece assembly; and
   - fulcrum means positioned in alignment with said tone arm when said tone arm is supported by said rest piece and spaced at a greater distance from the tone arm mounting means than said one of said magnet and armature in said rest piece to engage and provide a fulcrum for said tone arm when said one end of said tone arm is moved in a vertical plane,
   - said tone arm controlling mechanism operable to move said tone arm mounting means in a vertical plane to cause said tone arm to pivot about said fulcrum means and thereby break the contact between said magnet and said armature.

2. In an automatic record player mechanism of the type including a turntable, a tone arm, means for mounting said tone arm near one end thereof for movement in vertical and horizontal planes, and a tone arm controlling mechanism for moving said tone arm in horizontal and vertical planes:
   - a magnet;
   - an armature;
   - a tone arm rest piece assembly positioned adjacent said turntable for supporting said tone arm when said record player is not operating and including one of said magnet and armature mounted therein; and
   - means for mounting the other of said magnet and armature in said tone arm at a position to engage said one of said magnet and armature when said tone arm is supported by said rest piece assembly;
   - said rest piece assembly including fulcrum means positioned in alignment with said tone arm, when said tone arm is supported by said rest piece assembly, at a greater distance from said tone arm mounting means than said one of said magnet and armature in said rest piece assembly,
   - said tone arm controlling mechanism operable to raise vertically said tone arm mounting means to cause said tone arm to pivot about said fulcrum means and thereby break the contact between said magnet and said armature.

3. In an automatic record player mechanism of the type including a turntable, a tone arm, means for mounting said tone arm near one end thereof for movement in vertical and horizontal planes, and a tone arm controlling mechanism for moving said tone arm in horizontal and vertical planes:
   - a tone arm rest piece assembly positioned adjacent said turntable for supporting said tone arm when said record player is not operating, said assembly including a pedestal, and a magnet positioned in said pedestal;
   - an armature;
   - means for mounting said armature in said tone arm at a position to engage said magnet when said tone arm is supported by said rest piece assembly; and fulcrum means positioned in alignment with said tone arm, when said tone arm is supported by said rest piece assembly, at a greater distance from said tone arm mounting means than said magnet, said tone arm controlling mechanism operable to raise vertically said tone arm mounting means to cause said tone arm to pivot about said fulcrum means and thereby break the contact between said magnet and said armature.

4. In an automatic record player mechanism of the type including a turntable, a tone arm, means for mounting said tone arm near one end thereof for movement in vertical and horizontal planes, and a tone arm controlling mechanism for moving said tone arm in horizontal and vertical planes:

a tone arm rest piece assembly positioned adjacent said turntable for supporting said tone arm when said record player is not operating, said rest piece assembly including, a pedestal, a magnet positioned in said pedestal, fulcrum means forming an integral part of said pedestal and positioned in alignment with said tone arm, when said tone arm is supported by said rest piece assembly, at a greater distance from said tone arm mounting means than said magnet in said rest piece assembly;

an armature; and means for mounting said armature in said tone arm at a position to engage said magnet when said tone arm is supported by said rest piece assembly, said tone arm controlling mechanism operable to raise vertically said tone arm mounting means to cause said tone arm to pivot about said fulcrum means and thereby break the contact between said magnet and said armature.

5. In an automatic record player mechanism of the type including a turntable, a tone arm, means for mounting said tone arm near one end thereof for movement in vertical and horizontal planes, and a tone arm controlling mechanism for moving said tone arm in horizontal and vertical planes:

a tone arm rest piece assembly positioned adjacent said turntable for supporting said tone arm when said record player is not operating, said assembly including a pedestal, and a magnet positioned in said pedestal;

an armature;

means for mounting said armature in said tone arm at a position to engage said magnet when said tone arm is supported by said rest piece assembly;

means in said rest piece assembly for adjusting the position of said magnet relative to said armature for maximum contact therewith when said tone arm is supported by said rest piece assembly; and fulcrum means positioned in alignment with said tone arm, when said tone arm is supported by said rest piece assembly, at a greater distance from said tone arm mounting means than said magnet, said tone arm controlling mechanism operable to raise vertically said tone arm mounting means to cause said tone arm to pivot about said fulcrum means and thereby break the contact between said magnet and said armature.

6. In an automatic record player mechanism of the type including a turntable, a tone arm, means for mounting said tone arm near one end thereof for movement in vertical and horizontal planes, and a tone arm controlling mechanism for moving said tone arm in horizontal and vertical planes:

a tone arm rest piece assembly positioned adjacent said turntable for supporting said tone arm when said record player is not operating, said assembly including a pedestal having upstanding side portions, and a magnet positioned in said pedestal and between said side portions;

an armature;

means for mounting said armature in said tone arm at a position to engage said magnet when said tone arm is supported by said rest piece assembly; and fulcrum means positioned in alignment with said tone arm, when said tone arm is supported by said rest piece assembly, at a greater distance from said tone arm mounting means than said magnet, said tone arm controlling mechanism operable to raise vertically said tone arm mounting means to cause said tone arm to pivot about said fulcrum means and thereby break the contact between said magnet and said armature.

References Cited

UNITED STATES PATENTS 2,962,289 11/1960 Greene ............ 274—23 X
3,162,450 12/1964 Zimmermann ........ 274—23

HARRY N. HAROIAN, *Primary Examiner.*

LEONARD FORMAN, *Examiner.*